United States Patent
Bhatawadekar et al.

(10) Patent No.: US 9,478,031 B2
(45) Date of Patent: Oct. 25, 2016

(54) SCALE ERROR CORRECTION IN A MULTI-DIMENSIONAL MODEL

(71) Applicant: HOVER INC., San Francisco, CA (US)

(72) Inventors: Vineet Bhatawadekar, Mountain View, CA (US); Shaohui Sun, Mountain View, CA (US); Ioannis Pavlidis, San Mateo, CA (US); Adam J. Altman, San Francisco, CA (US)

(73) Assignee: HOVER INC., San Francisco, CA (US)

( * ) Notice: Subject to any disclaimer, the term of this patent is extended or adjusted under 35 U.S.C. 154(b) by 1 day.

(21) Appl. No.: 14/610,850

(22) Filed: Jan. 30, 2015

(65) Prior Publication Data
US 2015/0221128 A1  Aug. 6, 2015

Related U.S. Application Data

(60) Provisional application No. 61/934,541, filed on Jan. 31, 2014.

(51) Int. Cl.
| | | |
|---|---|---|
| *G06T 17/05* | (2011.01) | |
| *G06T 7/00* | (2006.01) | |
| *G06T 19/20* | (2011.01) | |

(52) U.S. Cl.
CPC ............ *G06T 7/004* (2013.01); *G06T 7/0083* (2013.01); *G06T 17/05* (2013.01); *G06T 19/20* (2013.01); *G06T 2207/30184* (2013.01); *G06T 2210/04* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2003/0052896 A1* | 3/2003 | Higgins | ............... | G09B 29/102 345/619 |
| 2007/0168153 A1 | 7/2007 | Minor et al. | | |
| 2008/0316230 A1* | 12/2008 | Su | ............. | G01C 21/36 345/667 |
| 2009/0043504 A1* | 2/2009 | Bandyopadhyay | .... | G01C 17/38 701/469 |
| 2009/0045839 A1 | 2/2009 | Herzl et al. | | |
| 2009/0045841 A1 | 2/2009 | Beckenbaugh et al. | | |
| 2010/0074538 A1 | 3/2010 | Mishra et al. | | |
| 2012/0223965 A1 | 9/2012 | Pershing | | |
| 2013/0044129 A1 | 2/2013 | Latta et al. | | |
| 2013/0176334 A1* | 7/2013 | Boldyrev | ............... | G09G 5/377 345/633 |
| 2013/0201214 A1* | 8/2013 | Piippo | ....................... | G06F 3/14 345/633 |
| 2013/0281100 A1* | 10/2013 | Lanzo | ................... | H04W 16/18 455/446 |

OTHER PUBLICATIONS

International Searching Authority; International Search Report and Written Opinion; International Application No. PCT/US2015/13835; May 1, 2015; 8 pgs.

(Continued)

*Primary Examiner* — Jacinta M Crawford
*Assistant Examiner* — Jonathan M Cofino
(74) *Attorney, Agent, or Firm* — Garlick & Markison; Randy W. Lacasse

(57) ABSTRACT

A system and method is provided for identifying error and rescaling and constructing or reconstructing a multi-dimensional (e.g., 3D) building model using street-level imagery. Street-level imagery is used to identify architectural elements that have known architectural standard dimensions. Dimensional measurements of architectural elements in the multi-dimensional building model (poorly scaled) are compared with known architectural standard dimensions to rescale and construct/reconstruct an accurate multi-dimensional building model.

15 Claims, 8 Drawing Sheets

(56) References Cited

OTHER PUBLICATIONS

SketchUp Knowledge Base, Tape Measure Tool: Scaling an entire model, http://help.sketchup.com/en/article/95006, 2013 Trimble Navigation Limited, 2 pages.
Pu et al., "Automatic Extraction of Building Features From Terrestrial Laser Scanning," International Institute for Geo-information Science and Earth Observation, 5 pages.
"Scale & Area Measurement" http://www.geog.ucsb.edu/~jeff/115a/lectures/scale_and_area_measurement.html, 8 pages.
Caramba App Development, "EasyMeasure—Measure with your Camera! on the App Store on iTunes", https://itunes.apple.com/us/app/easymeasure-measure-measure-your-camera!/id349530105?mt=8, 2 pages.

* cited by examiner

SCALE ERROR CORRECTION IN A MULTI-DIMENSIONAL MODEL

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 61/934,541, entitled "Scale Error Correction in a Geo-Referenced Three-Dimensional (3D) Model," filed Jan. 31, 2014, which is hereby incorporated herein by reference in its entirety and made part of the present U.S. Utility Patent Application for all purposes.

This application makes reference to the complete subject matter of U.S. Utility patent application Ser. No. 13/624,816 entitled "Three-Dimensional Map System" filed Sep. 21, 2012, now U.S. Pat. No. 8,878,865 and U.S. patent application Ser. No. 12/265,656 entitled "Method and System for Geometry Extraction, 3D Visualization and Analysis Using Arbitrary Oblique Imagery" filed Nov. 5, 2008, now U.S. Pat. No. 8,422,825, issued on Apr. 16, 2013, both of which are incorporated herein by reference in their entirety.

BACKGROUND

1. Technical Field

The technology described herein relates generally to a system and method for correcting scale errors in a geo-referenced multi-dimensional (e.g., 3D) model, and in particular to a system and method for rescaling and reconstructing a multi-dimensional model using known architectural standards.

2. Description of Related Art

Location-based technologies and mobile technologies are often considered the center of the technology revolution of this century. Essential to these technologies is a way to best present location-based information to devices, particularly mobile devices. The technology used to represent this information has traditionally been based on a two dimensional (2D) map. Some efforts have been made to generate three-dimensional (3D) maps of urban cities with accurate 3D textured models of the buildings via aerial imagery or specialized camera-equipped vehicles. However, these 3D maps have limited texture resolution, geometry quality, inaccurate scaling and are expensive, time consuming and difficult to update and provide no robust real-time image data analytics for various consumer and commercial use cases.

DETAILED DESCRIPTION

Figure 1:
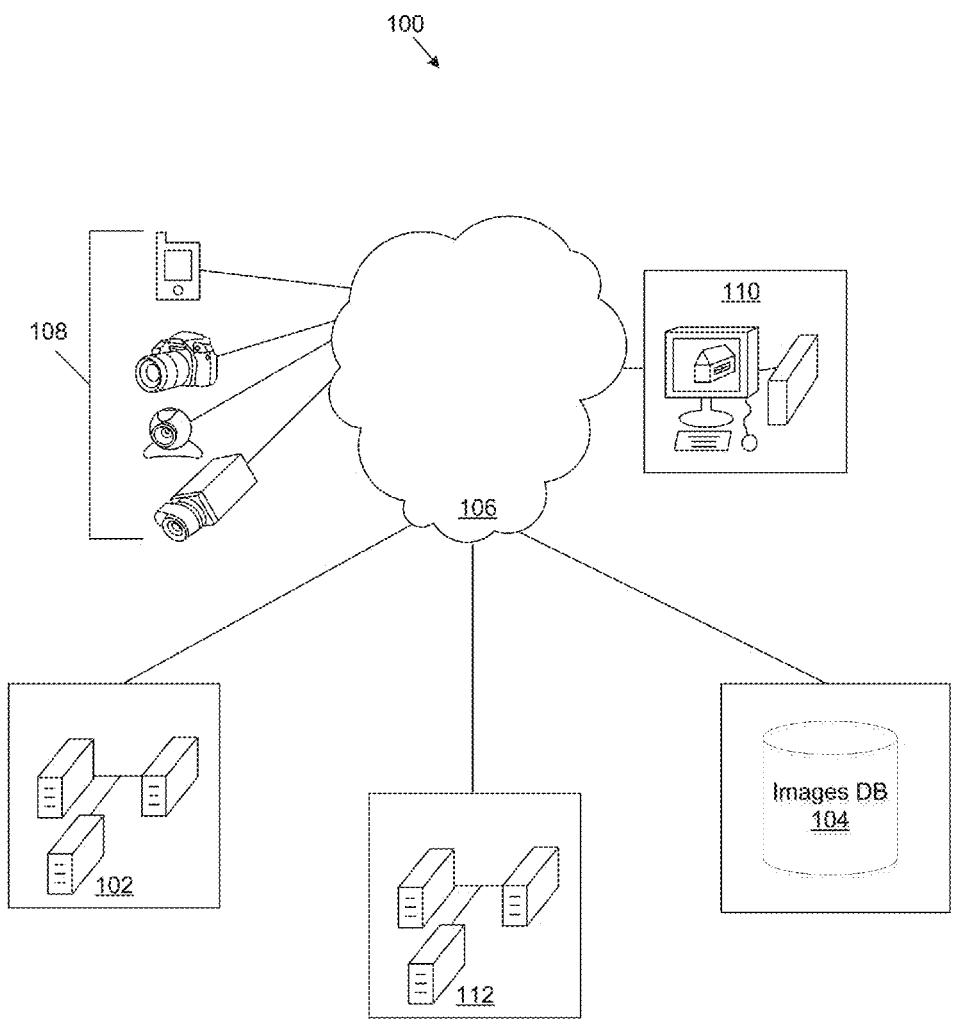
FIG. 1 illustrates one embodiment of a system architecture in accordance with the present disclosure.

FIG. 1 illustrates one embodiment of system architecture in accordance with the present disclosure. In one embodiment, image processing system 100 includes image processing servers 102. Image database (DB) 104 and image processing servers 102 are coupled via a network channel 106.

The network channel 106 is a system for communication. Network channel 106 includes, for example, an Ethernet or other wire-based network or a wireless NIC (WNIC) or wireless adapter for communicating with a wireless network, such as a WI-FI network. In other embodiments, the network channel 106 includes any suitable network for any suitable communication interface. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 106 can be a wireless PAN (WPAN) (such as, for example, a BLU-ETOOTH WPAN), a WI-FI network, a WI-MAX network, a 3G or 4G network, a cellular telephone network (such as, for example, a Global System for Mobile Communications (GSM) network).

In one embodiment, the network channel 106 uses standard communications technologies and/or protocols. Thus, the network channel 106 can include links using technologies such as Ethernet, 802.11, worldwide interoperability for microwave access (WiMAX), 3G, 4G, CDMA, digital subscriber line (DSL), etc. Similarly, the networking protocols used on the network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over the network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one or more embodiments, the image processing servers 102 include suitable hardware/software in the form of circuitry, logic gates, and/or code functions to process street-level images to include, but not limited to, geo-referencing and calculation of one or more image measurements according to a geo-referenced orthogonal image.

Capture device(s) 108 is in communication with image processing servers 102 for collecting images of building objects. Capture devices 108 are defined as electronic devices for capturing images. For example, the capture devices include, but are not limited to: a camera, a phone, a smartphone, a tablet, a video camera, a security camera, a closed-circuit television camera, a computer, a laptop, a webcam, wearable camera devices, photosensitive sensors, equivalents or any combination thereof.

Image processing system 100 also provides for viewer device 110 that is defined as a display device. For example, viewer device 110 can be a computer with a monitor, a laptop, a touch screen display, a LED array, a television set, a projector display, a wearable heads-up display of some sort, or any combination thereof. In one or more embodiments, the viewer device includes display of one or more building facades and associated measurements, such as, for example, a mobile device, a conventional desktop personal computer having input devices such as a mouse, keyboard, joystick, or other such input devices enabling the input of data and interaction with the displayed images and associated measurements.

In one embodiment, street-level images of a physical building are uploaded to image processing system 100 from a capture device. An uploaded image is, for example, a digital photograph of a physical building showing a façade (side) of the physical building. Image processing system 100 is used to generate accurately textured, geo-referenced 2D/3D building models based on the collected street-level images. The textured, geo-referenced 2D/3D building models are generated using systems and methods, for example, as provided in U.S. Pat. No. 8,878,865, and U.S. Pat. No. 8,422,825, and hereby incorporated by reference. In addition third party sources of textured models can be substituted in the various embodiments described herein without departing from the scope of the technology described.

However, orthogonal imagery used for geo-referencing is inherently inaccurate and/or of low resolution resulting in scaled 2D/3D models that are not accurate enough to extrapolate precise dimensions. For example, a scaled 3D model can be used to calculate dimensions for building materials (i.e., siding for an exterior wall, exterior brick, a door, etc.) in a construction project. Using an orthogonally geo-referenced 3D model, the calculated dimensions are likely to include error given the low resolution and potential for visibility errors (e.g., occlusions).

It is known that some architectural elements used in the construction industry are standardized. For example, rows of siding applied to exterior walls are typically separated by 6-10 inches (depending on the type of siding and location). However, it is understood that other dimensions exist and that the technology described herein is not limited to the specific dimensions provided in example embodiments.

In one or more embodiments of the technology described herein, a system and method is provided for correcting error in a textured geo-referenced multi-dimensional building model. Images texturing a multi-dimensional building model are used to identify scale error by comparing to known architectural dimensions. Once scale error is identified, the textured models are reconstructed with accurately scaled multi-dimensional building models.

Figure 2:
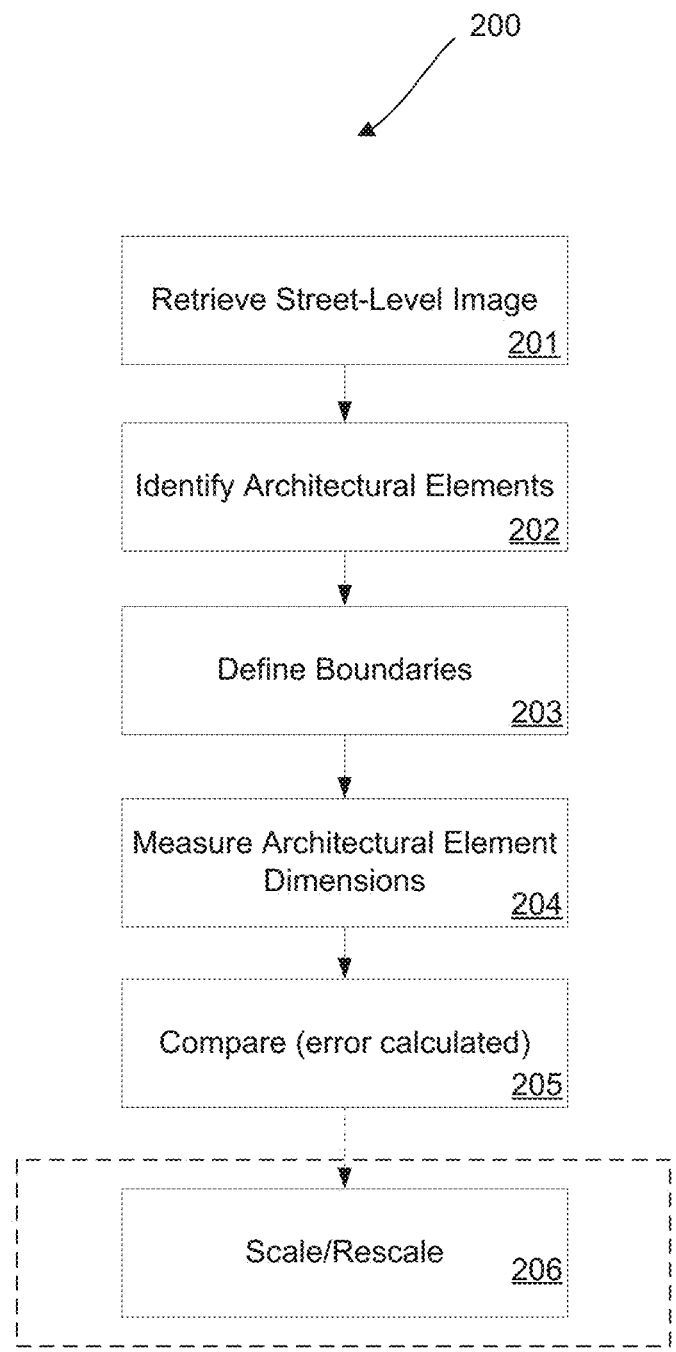
FIG. 2 illustrates a flowchart representing one embodiment of a process for accurately rescaling a multi-dimensional building model in accordance with the present disclosure.

FIG. 2 illustrates a flowchart representing one embodiment process for accurately rescaling a textured multi-dimensional building model in accordance with the present disclosure. In step 201, at least one street-level image is retrieved to identify error. In one embodiment, only a portion of the street-level image is retrieved since the entire image (façade) may not be needed for scale error corrections. This portion, for example front façade, may include a cut-out of a full 2D image that has been rectified and correlated to vertices of geometric planes/polygons that make up a portion of a 3D model. For example, the portion may be a close up of the front porch of a house that includes the front door. In step 202, known architectural elements of the street-level image are identified. In one embodiment, architectural elements are identified using known image or object recognition techniques, including those techniques of the US references incorporated herein by reference. In alternative embodiments, the identification of architectural elements is accomplished using other approaches. For example, the boundaries for rows of siding are automatically identified using line detection techniques (e.g., frequency domain filtering). For another example, boundaries (i.e., siding, bricks, etc.) are identified using unique feature detection methods that look for repeated, consistent parallel lines or line intersections. For yet another example, boundaries for architectural elements are detected using unsupervised clustering algorithms based on learned, predictable patterns. For yet another example, boundaries can be manually marked up (e.g., by human observer).

In one embodiment, the boundaries for the identified architectural element(s) are defined by correlating pixels to the boundaries within the street-level image. In a textured, geo-referenced multi-dimensional building model, pixel positions are extrapolated from vertices/edges of the multi-dimensional building model. The vertices/edges of a multi-dimensional building model are geo-referenced with known real-world positions and textured with a street-level image. The known real-world positions of the vertices/edges of the multi-dimensional building model are used to extrapolate the real-world positions of each pixel in the street-level image that was used in texturing the multi-dimensional building model. In step 203, the pixels of the street-level image are correlated to the boundaries of the identified architectural element to define the boundaries in the real-world coordinate frame.

A measurement of the architectural element is conducted in step 204 using image processing system 100 of FIG. 1. In one embodiment, siding rows are used as the known architectural element and the distance between siding rows (top boundary and bottom boundary) is measured in the geo-referenced multi-dimensional model. Pixels defining the boundaries of the architectural elements are identified as geo-referenced pixels within the multi-dimensional building model. In one embodiment, a plurality of measurements are conducted to determine an average measurement between pixels representing the boundaries of a siding row.

It is anticipated that the measurement of the geo-referenced model architectural elements will contain inaccuracies due to the orthogonal imagery resolution. This inherent inaccuracy is leveraged to improve the accuracy of the dimensions in the multi-dimensional building model. The calculated average measurement value of the known architectural element is compared to a threshold measurement according to known architectural standard dimensions in step 205. The threshold measurement accounts for the inherent inaccuracy of the orthogonally imagery and provides a likely range of values that are used to correlate the average measurement value to an actual measurement value (real dimensions based on known architectural standard dimensions). For example, if the known architectural standard dimensions for a solar panel is 10×10 (feet), the threshold will be established using, for example, +/−10% of the 10 feet (or up to 1 ft) in both directions (x and y). If the average measurement falls within the threshold, it is assumed that the average measurement is likely to be the known architectural standard dimension. If the average measurement fails to fall within the threshold, it is assumed that it does not apply to the known architectural standard or it is from a different standard dimension (i.e., 5×5, 15×15, etc.).

In one embodiment, the known architectural standard dimension is a distance between rows of siding on the façade of a building. As previously discussed, the boundaries (top and bottom edges) for rows of siding applied to exterior walls of a building object are frequently separated by 6-10 inches (depending on the type of siding). In one embodiment, a street-level image having siding exposed on at least one exterior wall is provided that corresponds to a textured geo-referenced multi-dimensional building model. Image processing system 100 of FIG. 1 identifies the exterior siding using known computer vision techniques, defines the boundaries of the siding rows, correlates the pixels to the defined boundaries and measures the distance between the boundary defining pixels of adjacent rows. In one embodiment, the distance between the boundaries is measured in a plurality of locations on the exterior wall to create an average measurement value.

The average measurement value of the boundaries between the rows of siding is compared to known architectural standard dimensions of, for example, 6 inches, 7 inches, 8 inches, etc. separating each row from an adjacent row. For example, an average measurement of 6.63 inches indicates ambiguity whether it is actually 6 inches (would represent approx. 10.5% error) or 7 inches (would represent approx. 5.3% error) as the architectural dimension standards indicate. In one embodiment, the average measurement falls within a given threshold range of +/−10% (inherent orthogonal imagery error). An average measurement value of 6.63 inches is indicative that the siding may represent either the 6 inch or 7 inch architectural standard dimension. To determine actual dimensions, the average measurement value is compared to the threshold ranges for both 6 inches and 7 inches. In order for the 6.63 inch average measurement to be correlated to an actual measurement of 6 inches, the average measurement would have to fall between 5.4 inches and 6.6 inches (0.6 inches=10%). The average measurement of 6.63 (i.e., 10.5%) is outside of the threshold and, therefore, the rows of siding are not correlated to a 6 inch distance between rows. While described using a +/−10% threshold, other thresholds are envisioned without departing from the scope of the technology described herein.

In the same example, in order for the average measurement to be correlated to an actual measurement of 7 inches, the average measurement would have to fall between the threshold range of 6.3 inches and 7.7 inches. The average measurement of 6.63 inches (i.e., 5.3%) falls between the threshold so it is determined that the distance between rows of siding has high likelihood of an actual value of 7 inches.

In another embodiment, a door is used as the known architectural standard dimension. There are various sizes of doors used in the construction industry (e.g., single doors, French doors, etc.). In one example, a typical door size may be 30×80 (i.e., 30 inches wide by 80 inches high). It is understood by those skilled in the art that the technology described here includes, but is not limited to, commonly used door sizes (e.g., the most common widths are 28, 30 and 32 inches; typically around than 80 inches.)

Using the process described above, a street-level image is used to identify the door as an architectural element. In one embodiment, an average measurement of the width and the height is determined and compared to the threshold. In one embodiment, a width-to-height ratio or height-to-width ratio of the architectural element is determined and compared to a known threshold ratio. In another embodiment, the total area of the door is determined and used as the average measurement value. Using the comparison of the average measurement to the threshold, the actual door size is determined based on the known door standard dimensions.

In yet another embodiment, bricks sizes are used as the known architectural standard dimensions. There are various sizes of bricks used in the construction industry (e.g., standard, modular, Norman, Roman, jumbo, etc.). The size of the brick is used to extrapolate a wall size and identify error in a geo-referenced building model. For example, a typical brick dimension is 3½×2¼×8 (depth (D)×height (H)×length (L) in inches). However, it is understood by those skilled in the art that the technology described here includes, but is not limited to, other commonly used bricks dimensions listed in Table 1.

TABLE 1 brick types and standard dimensions.

| Brick Type | Actual Size<br>D × H × L (inches) |
|---|---|
| Modular | 3½ × 2¼ × 7½ |
| Norman | 3½ × 2¼ × 11½ |
| Roman | 3½ × 1¼ × 11½ |
| Jumbo | 3½ × 2½ × 8 |
| Economy | 3½ × 3½ × 7½ |
| Engineer | 3½ × 2¾ × 7½ |
| King | 3 × 2¾ × 9¾ |
| Queen | 3 × 2¾ × 8 |
| Utility | 3½ × 3½ × 11½ |

In a similar process to the previously discussed embodiment of using siding rows as the known architectural standard dimension, brick height and width is used to identify error in the building model. An average measurement of a distance between rows of bricks (from the bottom of one brick to the bottom of the brick above including mortar) is compared to known architectural standard dimensions separating each row from a subsequent row. An average measurement value of the geo-reference multi-dimensional building model's brick façade is determined and compared to the threshold values for known architectural dimensions separating the brick rows. Threshold values are established for each of the brick types and the comparison is made between the average measurement value and the known architectural standard dimension threshold. In other embodiments, a brick's width or width and height, width-to-height or height-to-width ratio is compared against known dimensional architectural standards.

In step 206, the determined actual dimension of a known architectural element is used to scale/rescale and reconstruct the multi-dimensional (2D/3D) building model. In one embodiment, an untextured, geo-referenced multi-dimensional building model is rescaled using one of the vertices as an anchor point. For example, if the actual dimension determines that building model contains 10% error (too large), a geo-referenced vertex is used as an anchor point and the length of one of the lines/edges corresponding to the vertex is reduced by 10%. Once the edge has an accurate dimension, the vertex is anchored (i.e., anchored in a real-world position). The dimensions and position of the remaining vertices and edges are adjusted accordingly to maintain the original geometry (angles of the vertices) of the building model. In another embodiment, a centroid (the geometric center of the building model) is used as an anchor point and the dimensions of the vertices and edges are adjusted accordingly. Once a rescaled building model has been reconstructed, the building model is textured based on the street-level images with the original coordinates for textures.

Figure 3:
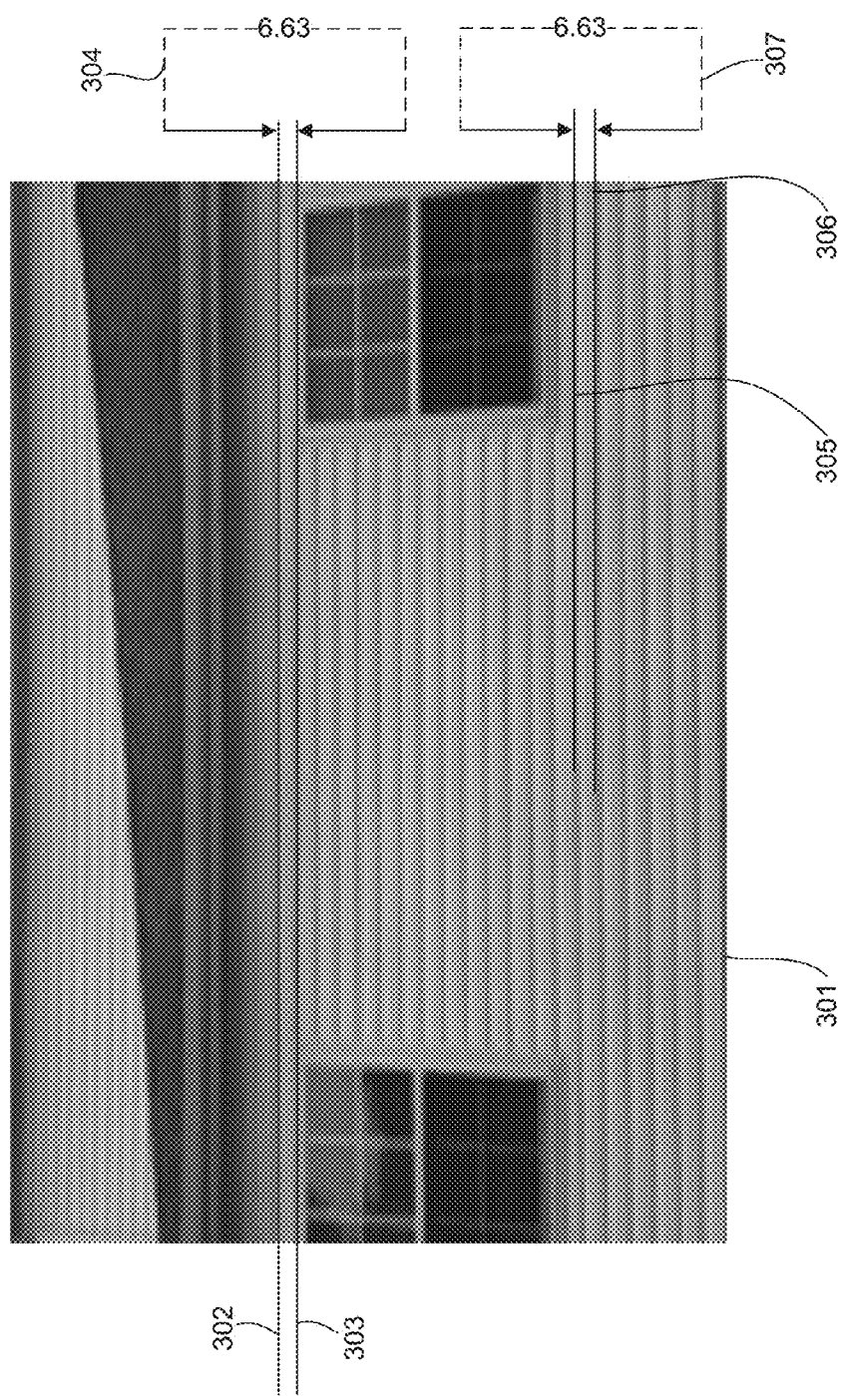
FIG. 3 illustrates an example embodiment for identifying error in a multi-dimensional building model using siding rows as the known architectural dimension in accordance with the present disclosure.

FIG. 3 illustrates an example embodiment for identifying error in a building model using siding rows as the known architectural dimension in accordance with the present disclosure. Street-level image 301 captures a building object showing a façade covered with siding. Using the techniques described previously, the pixels corresponding to the boundaries of each row of siding are determined. In one embodiment, the boundaries of the entire row (e.g., left edge of the façade to right edge of the façade) of siding are determined. In other embodiments, less than an entire row is used. Lines 302 and 303 define the upper and lower boundary of one row of siding. Measurement 304 determines the distance between the pixels defining the upper and lower boundary of the row of siding. In one embodiment, the number of pixels between the upper and lower boundary of the row of siding is determined and, based on the resolution of each pixel, a measurement (e.g., feet (f), inches (in), meters (m), centimeters (cm), etc.) can be extrapolated. In another embodiment, the boundaries of a portion of the siding row are determined. Lines 305 and 306 define the upper and lower boundaries of a portion of the row of siding. Measurement 307 determines the distance between the pixels defining the upper and lower boundaries of the row of siding. In yet another embodiment, measurements 304 and 307 are averaged to determine an average measurement of the distance between rows of siding.

In one embodiment, the camera orientation relative to the facades of the building in the image is solved using known methods. The building facade orientation information is used to skew (i.e., rectify) the street-level image to appear as if it was captured from directly in front of the corresponding façade of the building. By solving for the building facade orientations and rectifying the street-level image, the siding rows are parallel lines and do not converge to cause error in the average measurements across the length of the façade. In another embodiment, the street-level image is a rectified street-level image created during model construction and texturing.

Figure 4:
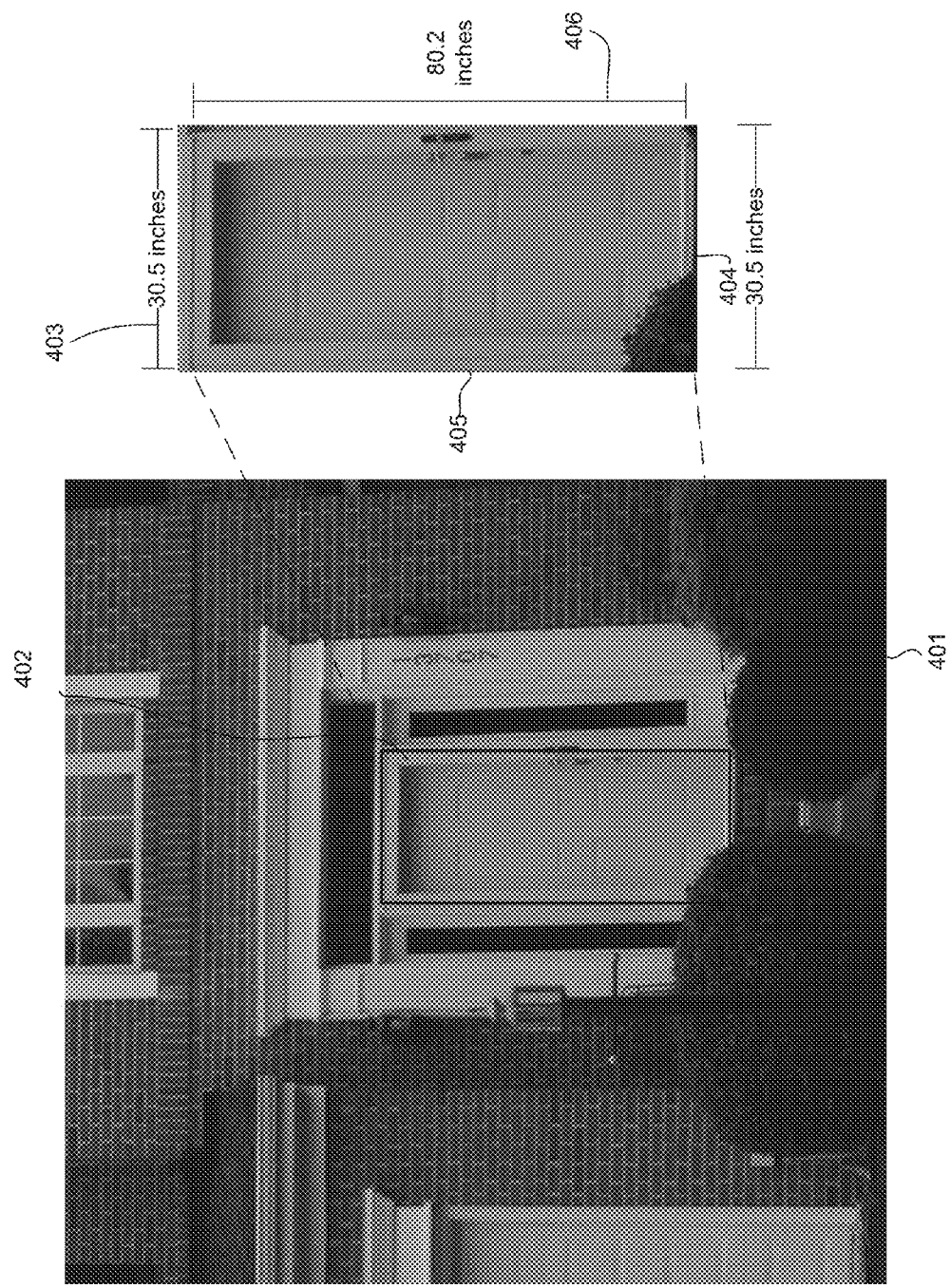
FIG. 4 illustrates an example embodiment for identifying error in a multi-dimensional building model using a door as the known architectural dimension in accordance with the present disclosure.

FIG. 4 illustrates an example embodiment for identifying error in a building model using a door as the known architectural dimension in accordance with the present disclosure. Street-level image 401 shows a front façade of a building object that includes a door. The boundaries of the known architectural feature (i.e., the door) are determined and a dimension is extrapolated based on the geo-referenced pixels of door 402 boundaries. For the example illustrated in FIG. 4, street-level image 401 provides a resolution 0.1 inches per pixel. It is determined that top dimension 403 and bottom dimension 404 (width dimensions) of door 402 have 305 pixels providing for a dimension of 30.5 inches (0.1 inches per pixel×305 pixels=30.5 inches). Additionally, it is determined that left dimension 405 and right dimension 406 (height dimensions) have 802 pixels, yielding an 80.2 inch left and right dimension for the door. In one embodiment, a ratio between the door height and width is used to identify error and determine the actual dimensions of the door. As with the previous examples, the measurements are compared to existing known door dimensions and error rates compared to identify a possible known architectural standards match. FIG. 4 is used for diagrammatic purposes, specific positioning and designation of dimensions may change from image-to-image and distinct architectural feature. For example, the known door architectural standard may include or not include the door frame as shown. For example, when an external storm door is also included, in some embodiments, measurements will be taken of the storm door only, the exterior door or both.

Figure 5:
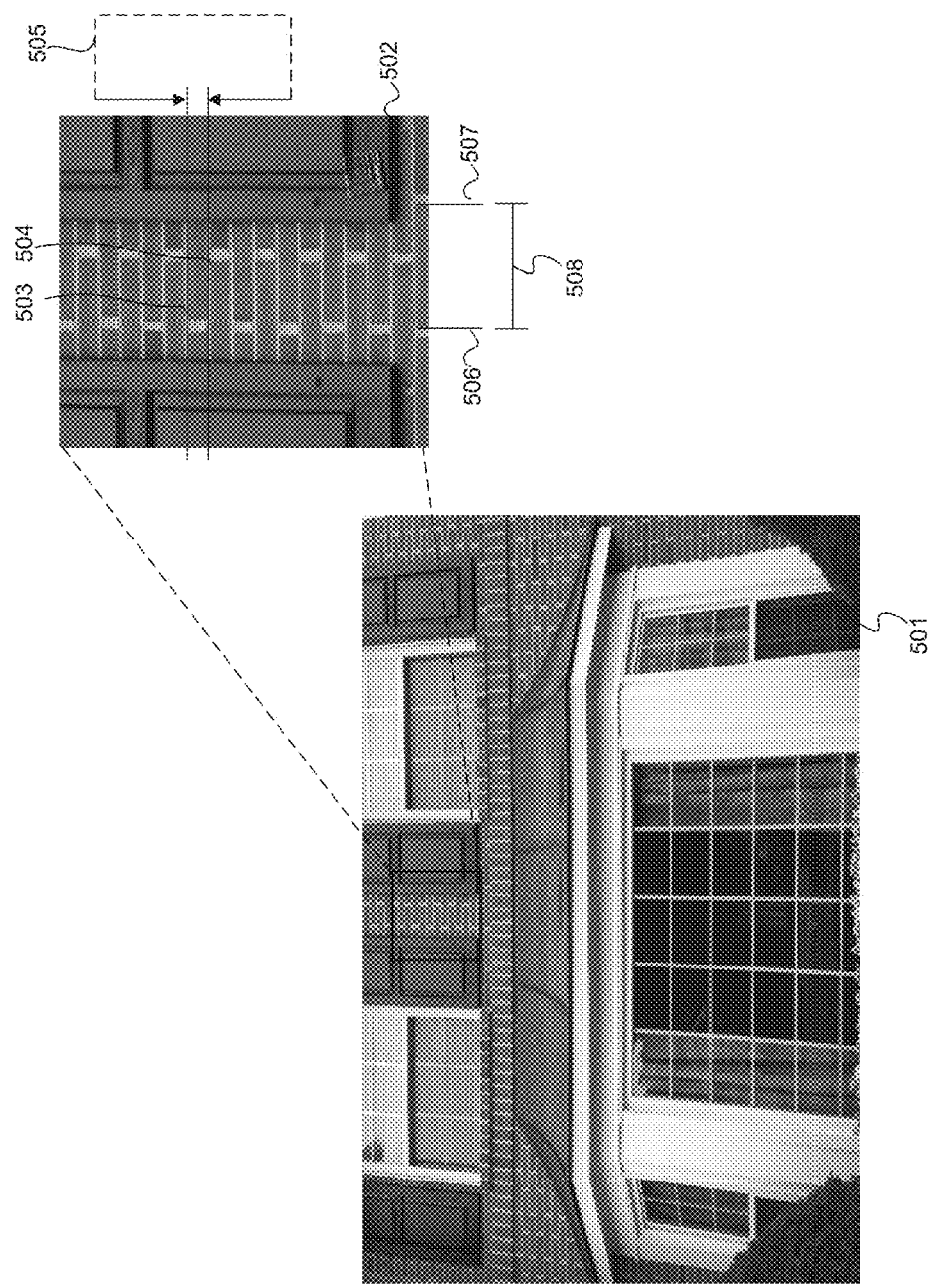
FIG. 5 illustrates yet another example embodiment for identifying error in a multi-dimensional building model using brick layout as the known architectural dimension in accordance with the present disclosure.

FIG. 5 illustrates yet another example embodiment for identifying error in a building model using a brick layout as the known architectural dimension in accordance with the present disclosure. Street-level image 501 captures a façade of a building object showing exposed brick. In one embodiment, a portion of the façade is used to establish the top and bottom boundaries of a horizontal row of brick in a similar technique to the previously discussed siding rows. Portion 502 shows an exposed brick façade with bricks in the traditional offset pattern. Top boundary 503 and bottom boundary 504 are determined for a row of bricks. Average measurement 505 is determined using the difference between the geo-referenced pixels corresponding to top boundary 503 and bottom boundary 504. The average measurement between top boundary 503 and bottom boundary 504 are compared to the known architectural standards for bricks dimensions (see Table 1) to determine actual dimensions. In another embodiment, the left boundary 506 and right boundary 507 of the brick are used to identify error and rescale and reconstruct the building model. Average measurement 508 is determined using the difference between the geo-referenced pixels corresponding to left boundary 506 and right boundary 507 and compared to the known architectural standards for brick dimensions. For greater accuracy of multiple smaller dimensioned architectural features (e.g., bricks), averaging of an error associated with a large number of the bricks will increase accuracy.

Figure 6:
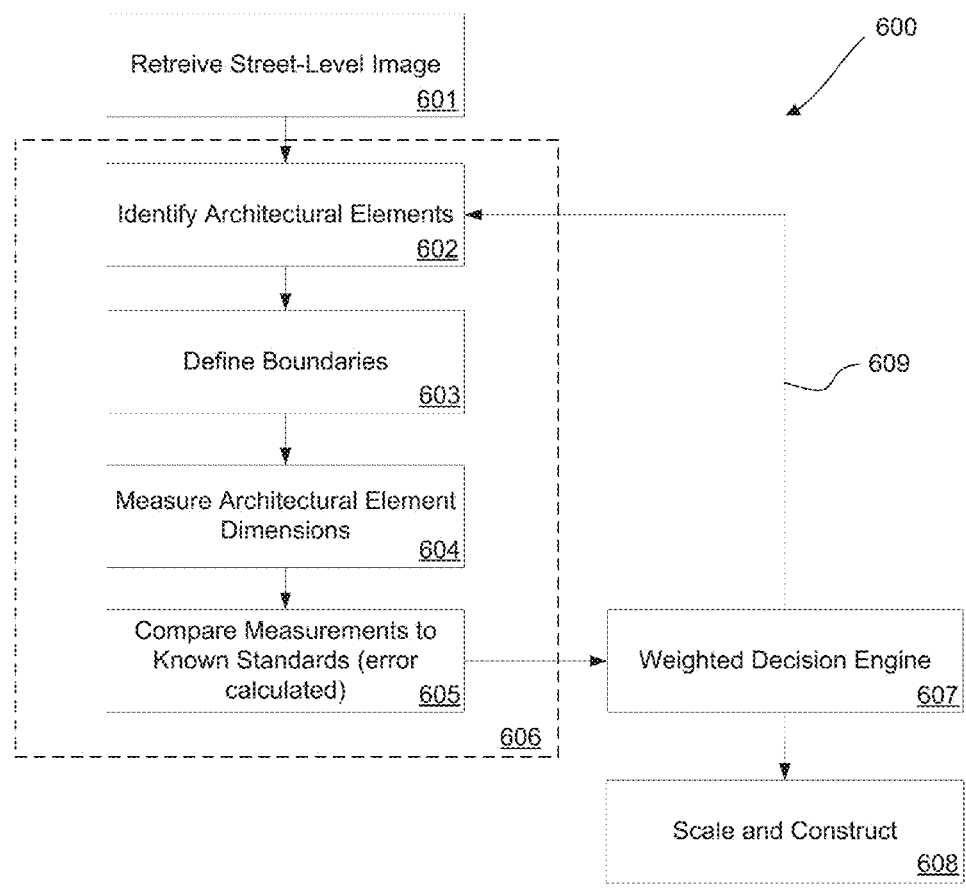
FIG. 6 illustrates an embodiment of a flowchart for improving the accuracy of the dimensions of a building model in accordance with the present disclosure.

FIG. 6 illustrates an embodiment of a flowchart for improving the accuracy of the dimensions of a building model in accordance with the present disclosure. In one embodiment, the process of identifying error, rescaling and reconstructing is used to improve the accuracy of a multi-dimensional building model. Process 600 includes identification of error in a multi-dimensional building model by retrieving a street-level image in step 601 that contains architectural elements (i.e., siding, brick, door, window, etc.). In step 602, boundaries of an architectural element are identified (e.g., siding). In step 603, the pixels of the street-level image are correlated to the boundaries of the identified architectural element to define the boundaries and are used to measure the dimensions of the architectural element in step 604. The measurement is compared to the known architectural element standard dimensions to determine the actual measurement in step 605. Steps 602 through 605 are repeatable 609 in an identification and measurement cycle 606.

In one embodiment, the repeated comparison between the measurement of multiple selections of an architectural element (e.g., siding measurements in various locations within the image) and the known architectural standard dimensions established in step 605 is fed into a weighted decision engine in step 607 to determine an average scaling error. The weighted decision engine in step 607 uses learned statistical analysis to improve scaling over time and measurements. As more statistical information is accumulated (learned), the weighted decision engine creates a more predictable result. In step 608, the building model is rescaled and reconstructed according to the decision determined by the weighted decision engine in step 607.

Figure 7:
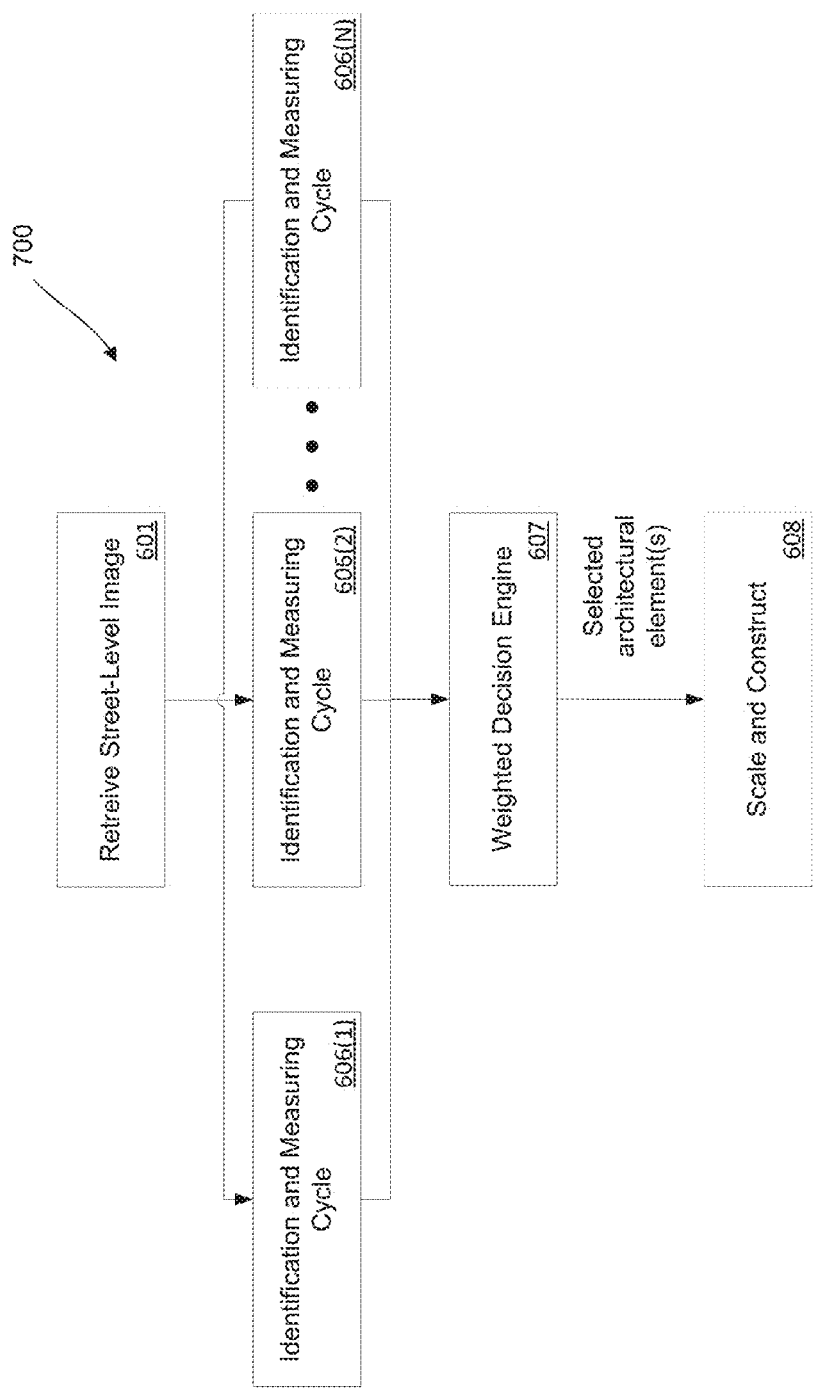
FIG. 7 illustrates an embodiment of a flowchart for weighing various known architectural elements to adjust scale in the dimensions of a multi-dimensional building model in accordance with the present disclosure.

FIG. 7 illustrates an embodiment of a flowchart for weighing various known architectural elements to adjust scale in the dimensions of a building model in accordance with the present disclosure. Process 700 includes identification of error in a multi-dimensional building model by retrieving a street-level image in step 601 that contains architectural elements. In one embodiment, the repeated identification and measurement cycle 606 is performed (606(1), 606(2) . . . 606(*n*)) for multiple architectural elements (e.g., siding (1), brick (2), door (3), etc.) identified in the street-level image retrieved in step 601. For example, if the retrieved street-level image includes more than one architectural element (e.g., a brick façade also showing the front door), identification and measurement cycle 606 (repeated for averaging) is performed for each architectural feature to determine which architectural feature(s) in weighted decision engine in step 607 would likely provide the most accurate, rescaled building model in step 608. For example, measuring the bricks may statistically prove a better gauge of scale error.

In one embodiment, a weighted decision engine is provided to determine the architectural elements(s) that are most likely to produce an accurately rescaled and reconstructed building model based on using a least quantity of processing or providing fastest cycle times, or that prove more accurate over time. In addition, location of architectural elements may determine specific façade scaling. For example, if a door on a façade indicates an error (4% too large) and bricks on a side façade indicate an error in width (3% too narrow), the different facades could be rescaled separately.

In addition, the various embodiments may be interchangeably implemented before, during or after construction of the multi-dimensional model.

Figure 8:
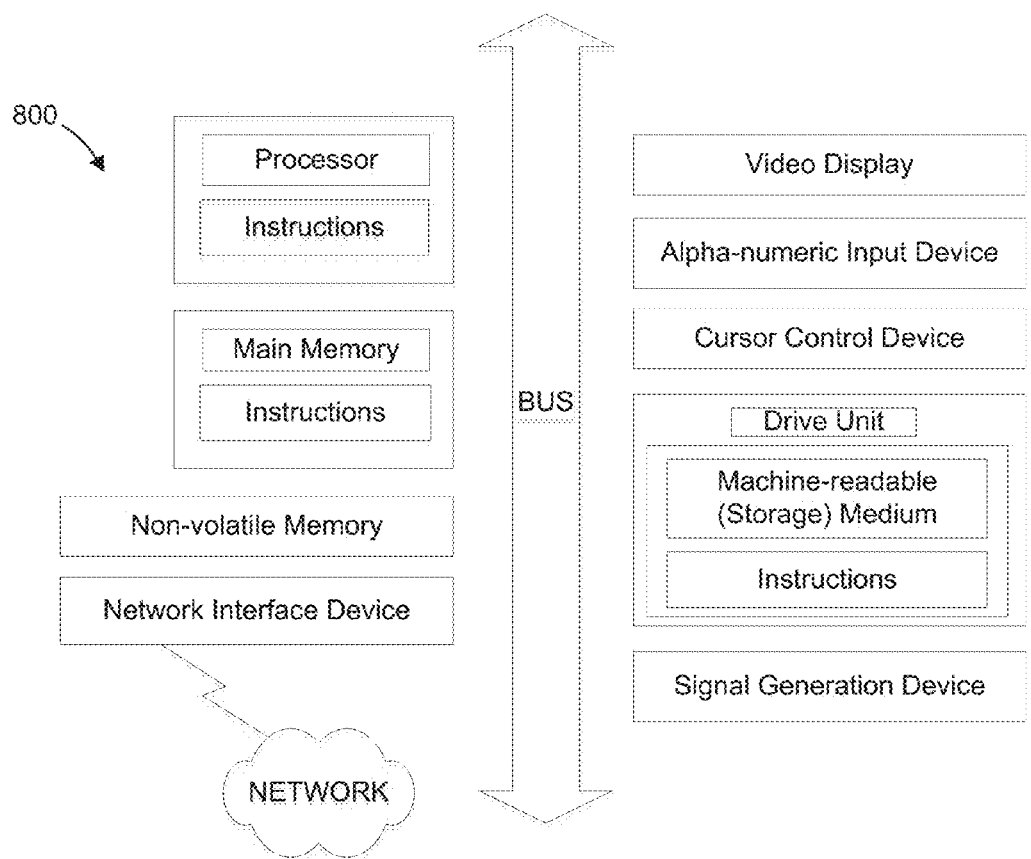
FIG. 8 illustrates a diagrammatic representation of a machine in the example form of a computer system in accordance with the present disclosure.

Referring now to FIG. 8, therein is shown a diagrammatic representation of a machine in the example form of a computer system 800 within which a set of instructions, for causing the machine to perform any one or more of the methodologies or modules discussed herein, may be executed. Computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIG. 1 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete the textured facades. The technology as described herein is not limited by the particular examples disclosed herein and expressly incorporates these other combinations.

What is claimed is:

1. A method of resealing a multi-dimensional building model comprising:
    retrieving an image used during construction of the multi-dimensional building model;
    identifying a plurality of boundaries for an architectural element located within the image and included in the multi-dimensional building model;
    defining the plurality of boundaries for the architectural element;
    measuring a distance between two or more of the plurality of boundaries of the architectural element;
    comparing the measured distance against one or more known dimensions, within a threshold of error, of at least one similar architectural element;
    determining an error in scaling of the image based on the comparing being performed against a selection of a plurality of sizes of the at least one similar architectural element and selecting a size that is dimensionally closest to the architectural element and within the threshold of error; and
    resealing the building model based on a difference between the measured distance and the one or more known dimensions of the similar architectural element of the selected size to correct for the determined error.

2. The method of claim 1, further comprising reconstructing the resealed multi-dimensional building model.

3. The method of claim 1, wherein the plurality of boundaries are defined automatically or manually.

4. The method of claim 3, wherein the plurality of boundaries are defined by a plurality of geo-referenced pixels.

5. The method of claim 1, wherein the architectural element includes any of: siding row(s), door(s), brick(s), or window(s) having known architectural standard dimensions.

6. The method of claim 1, wherein the retrieved image includes two or more architectural elements.

7. The method of claim 1, wherein the dimensions include any of: width, height, width and height, area, or a ratio of width-to-height or height-to-width.

8. The method of claim 1, wherein the retrieved images are rectified and correlated to vertices of geometric planes or polygons from the multi-dimensional model.

9. A system for resealing a multi-dimensional building model comprising:
    an image database operable to retrieve an image associated with the multi-dimensional building model; and
    an image processor communicatively coupled to the image database and operable to:
        identify a plurality of boundaries for an architectural element located within the image;
        define the plurality of boundaries for the architectural element;
        measure a distance between two or more of the plurality of boundaries of the architectural element;
        compare the measured distance between the two or more of the plurality of boundaries to a plurality of known similar architectural element's standard dimensions, within an error threshold;
        select, based on the comparing, actual dimensions of a known similar architectural element that is dimensionally closest to the architectural element;
        determine an error in scaling of the image based on comparing the measured distance to a respective dimension on the known similar architectural element; and
        rescale the multi-dimensional building model according to the error; and
    a weighted decision engine communicatively coupled to the image database and the image processor predicting which architectural element or combination of architectural elements would produce an accurately resealed building model based on repeating the comparing for a plurality of different ones of the architectural elements and selecting a minimum occurrence of the error in scaling.

10. The system of claim 9, wherein the distance measured between the two or more of the plurality of boundaries of the architectural element is extrapolated based on pixel resolution.

11. The system of claim 9, wherein the resealing is implemented during construction of the multi-dimensional building model.

12. The system of claim 9, wherein the architectural element includes any of: siding row(s), door(s), brick(s), or window(s) having known architectural standard dimensions.

13. The system of claim 9, wherein the retrieved image includes two or more architectural elements.

14. A method of determining scale for a multi-dimensional building model comprising:

a. retrieving an image for a multi-dimensional building model including two or more architectural elements;
b. identifying a plurality of boundaries for each of the two or more architectural elements within the image;
c. defining the plurality of boundaries for the each of the two or more architectural elements;
d. measuring a distance between two or more of the plurality of boundaries of the one of the two or more architectural elements;
e. comparing the measured distance between the two or more of the plurality of boundaries to a known architectural standard dimension, within an error threshold, to determine a actual measurement for each of the two or more architectural elements;
f. determining an error in scaling of the image based on the determined actual measurement; and
g. communicating the error in scaling of the each of the two or more architectural elements for accumulation in computer memory; and
h. determining, using a weighted decision engine, a final scale error based on a minimum scaling error for one of the two or more architectural elements.

15. The method of claim 14, wherein the weighted decision engine predicts, based on the determined errors in scaling, which architectural element of the two or more architectural elements would produce a most accurate resealed multi-dimensional building model.

\* \* \* \* \*

UNITED STATES PATENT AND TRADEMARK OFFICE
CERTIFICATE OF CORRECTION

PATENT NO.       : 9,478,031 B2
APPLICATION NO.  : 14/610850
DATED            : October 25, 2016
INVENTOR(S)      : Vineet Bhatawadekar et al.

It is certified that error appears in the above-identified patent and that said Letters Patent is hereby corrected as shown below:

Column 11, Line 46, in Claim 1: replace "resealing" with --rescaling--

Column 11, Line 66, in Claim 1: replace "resealing" with --rescaling--

Column 12, Line 4, in Claim 2: replace "resealed" with --rescaled--

Column 12, Line 21, in Claim 9: replace "resealing" with --rescaling--

Column 12, Line 49, in Claim 9: replace "resealed" with --rescaled--

Column 12, Line 58, in Claim 11: replace "resealing" with --rescaling--

Column 13, Line 27, in Claim 15: replace "resealed" with --rescaled--

Signed and Sealed this
Sixth Day of June, 2017

Michelle K. Lee
*Director of the United States Patent and Trademark Office*